US012664473B2

(12) United States Patent
Sonawane et al.

(10) Patent No.: US 12,664,473 B2
(45) Date of Patent: Jun. 23, 2026

(54) SYSTEMS AND METHODS FOR AUTOMATICALLY RETRAINING MACHINE LEARNING MODELS TO REMOVE SYSTEMATIC BIAS

(71) Applicant: Evernorth Strategic Development, Inc., St. Louis, MO (US)

(72) Inventors: Sandip Sonawane, Champaign, IL (US); Rahul Rajendran, Hackensack, NJ (US); Vijay Sai Kondamadugu, Dallas, TX (US); Amit K. Bothra, Wildwood, MO (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 673 days.

(21) Appl. No.: 18/112,088

(22) Filed: Feb. 21, 2023

(65) Prior Publication Data

US 2024/0296371 A1    Sep. 5, 2024

(51) Int. Cl.
*G06N 20/00*        (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 9,622,133 B1 | 4/2017 | Guvenc | |
| 9,672,474 B2 | 6/2017 | Dirac | |
| 9,740,985 B2 | 8/2017 | Byron | |
| 10,409,367 B2 | 9/2019 | Velez-Rojas | |
| 10,572,835 B2 | 2/2020 | Haririnia | |
| 10,715,638 B2 | 7/2020 | Garcia Duran | |
| 10,757,218 B2 | 8/2020 | Zhao | |
| 10,769,426 B2 | 9/2020 | Guo | |
| 11,636,386 B2 * | 4/2023 | Lohia | G06N 7/00 706/12 |
| 11,651,247 B2 * | 5/2023 | Golding | G06N 5/04 706/12 |
| 11,775,863 B2 * | 10/2023 | Wick | G06N 7/01 706/12 |
| 2016/0050589 A1 | 2/2016 | Safavi | |
| 2018/0232702 A1 | 8/2018 | Dialani | |
| 2021/0319333 A1 * | 10/2021 | Lee | G06N 3/0499 |

(Continued)

*Primary Examiner* — Barbara M Level
(74) *Attorney, Agent, or Firm* — Miller Johnson

(57)        ABSTRACT

A computer-implemented method includes generating a candidate machine learning model. The candidate machine learning model is configured to generate probability scores for members. The method includes training the candidate machine learning model using an initial data set, testing the candidate machine learning model to generate performance metrics indicative of a bias value correlated to the candidate machine learning model, and determining whether the performance metrics are below a threshold. In response to determining that the performance metrics are below the threshold the method includes generating a proxy feature based on the bias value, adding the proxy feature to the candidate machine learning model, calculating weights based on the bias value, updating the initial data set using the weights to generate an updated data set, and retraining the candidate machine learning model using the updated data set.

20 Claims, 9 Drawing Sheets

(56) References Cited

U.S. PATENT DOCUMENTS

| | | | |
|---|---|---|---|
| 2021/0383268 A1* | 12/2021 | Miroshnikov | G06N 20/00 |
| 2022/0004923 A1* | 1/2022 | Kamkar | G06Q 40/03 |
| 2022/0012542 A1* | 1/2022 | Cruz | G06N 5/01 |
| 2023/0121564 A1* | 4/2023 | Zou | G06N 3/09 |
| | | | 706/12 |
| 2024/0152818 A1* | 5/2024 | Schmidt | G06N 20/00 |
| 2024/0394574 A1* | 11/2024 | Datta | G06N 3/0464 |

* cited by examiner

Pallet Sizing And Pucking Device(s) — 206

Loading Device(s) — 208

Inspect Device(s) — 210

Unit of Use Device(s) — 212

Automated Dispensing Device(s) — 214

Manual Fulfillment Device(s) — 216

Review Devices — 218

Imaging Device(s) — 220

Cap Device(s) — 222

Accumulation Devices — 224

Packing Device(s) — 226

Literature Device(s) — 228

Unit of Use Packing Device(s) — 230

Mail Manifest Device(s) — 232

112

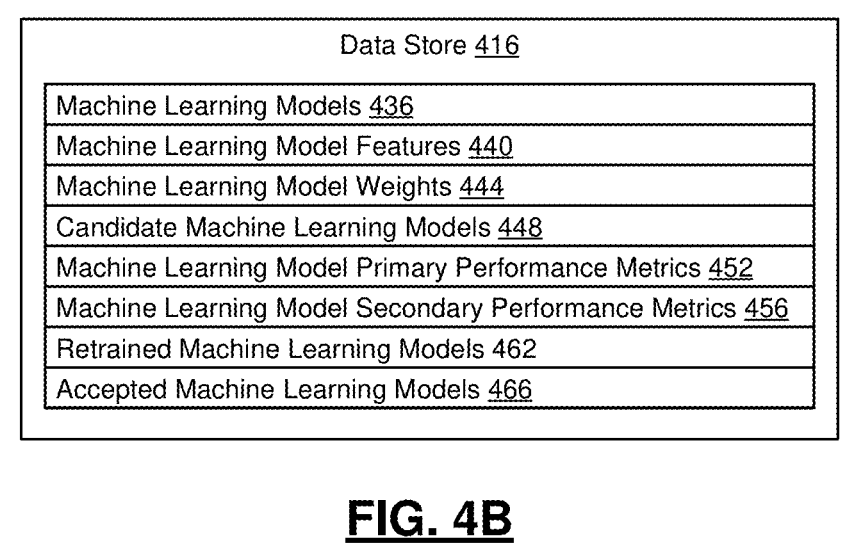

Data Store 416

| |
|---|
| Machine Learning Models 436 |
| Machine Learning Model Features 440 |
| Machine Learning Model Weights 444 |
| Candidate Machine Learning Models 448 |
| Machine Learning Model Primary Performance Metrics 452 |
| Machine Learning Model Secondary Performance Metrics 456 |
| Retrained Machine Learning Models 462 |
| Accepted Machine Learning Models 466 |

FIG. 4B

SYSTEMS AND METHODS FOR AUTOMATICALLY RETRAINING MACHINE LEARNING MODELS TO REMOVE SYSTEMATIC BIAS

FIELD

The present disclosure relates to training machine learning models and, more particularly, to identifying and correcting systematic errors in machine learning model training.

BACKGROUND

Machine learning technologies use algorithms and statistical models to analyze and draw inferences from patterns present in data sets. Accordingly, machine learning technologies do not require explicit instructions laying out their programming logic and are especially adept at helping organizations parse and make sense of ever larger and ever more diverse data sets. Machine learning technologies have been widely adopted by—and are transforming—many segments of the modern world. However, because machine learning technologies typically rely on a training process to determine suitable parameters for the specific machine learning model, individual machine learning models tend to be accurate only if their training processes are of high quality—systematic errors in training data sets or in training processes may result in flawed machine learning models that produce inaccurate or unusable results.

One example of a poorly trained machine learning model is one that exhibits bias. Machine learning models may be said to exhibit bias when there is are systematic differences between the average predictions of the machine learning models and reality. As a phenomenon, machine learning bias may occur as a result of erroneous assumptions or systematic flaws in the training process. However, because of the complexity of modern training data sets, such errors may be difficult to identify. As machine learning technologies become more ubiquitous and relied upon in every facet of modern life, the harm caused by systematically flawed machine learning models—such as biased models—may be widespread. Accordingly, there is a need for techniques and technologies that automatically identify bias in machine learning models and retrain the models to eliminate bias.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes generating a candidate machine learning model. The candidate machine learning model is configured to generate probability scores for members. The method includes training the candidate machine learning model using an initial data set, testing the candidate machine learning model to generate performance metrics indicative of a bias value correlated to the candidate machine learning model, and determining whether the performance metrics are below a threshold. In response to determining that the performance metrics are below the threshold, the method includes: generating a proxy feature based on the bias value, adding the proxy feature to the candidate machine learning model, calculating weights based on the bias value, updating the initial data set using the weights to generate an updated data set, and retraining the candidate machine learning model using the updated data set.

In other features, the method includes, in response to determining that the performance metrics are not below the threshold, saving the candidate machine learning model as an accepted machine learning model. In other features, the method includes testing the retrained candidate machine learning model to generate updated performance metrics and, in response to determining that the updated performance metrics are not below the threshold, saving the retrained candidate machine learning model as an accepted machine learning model. In other features, the performance metrics are generated by calculating a percentage favorable outcomes metric for a protected class. In other features, the method includes calculating a percentage favorable outcomes metric for a control class and calculating an impact ratio based on the percentage favorable outcomes metric for the protected class and the percentage favorable outcomes metric for the control class.

In other features, the percentage favorable outcomes metric for the protected class is calculated by determining a first value indicative of a number of members belonging to the protected class having generated probability scores above a second threshold, determining a second value indicative of a number of members belonging to the protected class, and calculating the percentage favorable outcomes metric for the protected class by dividing the first value by the second value. In other features, the percentage favorable outcomes metric for the protected class is calculated by determining a third value indicative of a number of members belonging to the protected class having generated probability scores above a second threshold, determining a fourth value indicative of a number of members belonging to the protected class, and calculating the percentage favorable outcomes metric for the protected class by dividing the first value by the second value.

In other features, the impact ratio is calculated by dividing the percentage favorable outcomes metric for the protected class by the percentage favorable outcomes metric for the control class. In other features, generating the proxy feature based on the bias values comprises determining a protected class associated with the bias value and generating the proxy feature to represent the protected class associated with the bias value. In other features the candidate machine learning model is a logistic regression model. In other features, the method includes adding the proxy feature to the machine learning model includes adding an input variable representing the proxy feature to the logistic regression model.

In other features, calculating weights based on the bias value includes dividing the initial data set into categories and for each category: calculating a fifth value related to a number of observances of the protected class or the control class in the category, calculating a sixth value related to a number of observances of a positive or a negative outcome in the category, calculating a seventh value related to a total number of observances in the initial data, calculating an eighth value related to a total number of observances in the category, and dividing a product of the fifth value and the sixth value with a product of the seventh value and the eighth value.

A system includes memory hardware configured to store instructions and processing hardware configured to execute the instructions. The instructions include generating a candidate machine learning model. The candidate machine learning model is configured to generate probability scores for members. The instructions include training the candidate machine learning model using an initial data set, testing the candidate machine learning model to generate performance metrics indicative of a bias value correlated to the candidate machine learning model, and determining whether the performance metrics are below a threshold. In response to determining that the performance metrics are below the threshold, the instructions include: generating a proxy feature based on the bias value, adding the proxy feature to the candidate machine learning model, calculating weights based on the bias value, updating the initial data set using the weights to generate an updated data set, and retraining the candidate machine learning model using the updated data set.

In other features, the instructions include, in response to determining that the performance metrics are not below the threshold, saving the candidate machine learning model as an accepted machine learning model. In other features, the instructions include testing the retrained candidate machine learning model to generate updated performance metrics and, in response to determining that the updated performance metrics are not below the threshold, saving the retrained candidate machine learning model as an accepted machine learning model. In other features, the performance metrics are generated by calculating a percentage favorable outcomes metric for a protected class, calculating a percentage favorable outcomes metric for a control class, and calculating an impact ratio based on the percentage favorable outcomes metric for the protected class and the percentage favorable outcomes metric for the control class.

In other features, the percentage favorable outcomes metric for the protected class is calculated by determining a first value indicative of a number of members belonging to the protected class having generated probability scores above a second threshold, determining a second value indicative of a number of members belonging to the protected class, and calculating the percentage favorable outcomes metric for the protected class by dividing the first value by the second value. In other features, the percentage favorable outcomes metric for the protected class is calculated by determining a third value indicative of a number of members belonging to the protected class having generated probability scores above a second threshold, determining a fourth value indicative of a number of members belonging to the protected class, and calculating the percentage favorable outcomes metric for the protected class by dividing the first value by the second value.

In other features, the impact ratio is calculated by dividing the percentage favorable outcomes metric for the protected class by the percentage favorable outcomes metric for the control class. In other features, generating the proxy feature based on the bias values comprises determining a protected class associated with the bias value and generating the proxy feature to represent the protected class associated with the bias value. In other features, the candidate machine learning model is a logistic regression model and adding the proxy feature to the machine learning model includes adding an input variable representing the proxy feature to the logistic regression model.

In other features, calculating weights based on the bias value includes dividing the initial data set into categories and, for each category: calculating a fifth value related to a number of observances of the protected class or the control class in the category, calculating a sixth value related to a number of observances of a positive or a negative outcome in the category, calculating a seventh value related to a total number of observances in the initial data, calculating an eighth value related to a total number of observances in the category, and dividing a product of the fifth value and the sixth value with a product of the seventh value and the eighth value.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 4B is a block diagram showing example data structures that may be stored in data stores of a machine learning model training system.

In the drawings, reference numbers may be reused to identify similar and/or identical elements.

DETAILED DESCRIPTION

Systematic biases present in training data sets and/or flaws in training processes may result in improperly trained machine learning models, such as models that exhibit bias. Automated model evaluation and regeneration systems may automatically test machine learning models for bias and retrain and/or regenerate any biased machine learning models. Examples of bias the systems may be configured to identify and eliminate include categories such as age, gender, and race. While the systems may be particularly applicable to machine learning models developed for clinical risk-based modeling, the systems may be deployed in conjunction with any kind of machine learning models to eliminate any kind of systematic bias.

In various implementations, the systems may generate a candidate machine learning model and test the candidate machine learning model to generate primary and/or secondary performance metrics. In various implementations, the systems may determine whether the secondary performance metrics are below a threshold. If the secondary performance metrics are below the threshold, the systems may regenerate and/or retrain the candidate machine learning model and retest the retrained machine learning model. If the secondary performance metrics of the candidate and/or retrained machine learning model are not below the threshold, the systems may save the candidate and/or retrained machine model as an accepted machine learning model.

In various implementations, the system may be deployed in conjunction with an in-house predictive modeling framework for clinical risk-based machine learning models. The system may be integrated with the in-house predictive modeling framework as one automated system where the output of the modeling framework is a machine learning model with biases eliminated or, in various implementations, ameliorated. In various implementations, the system may be configured to work in tandem with the in-house predictive modeling framework used to develop logistic regression-based predictive models.

High-Volume Pharmacy

Figure 1:
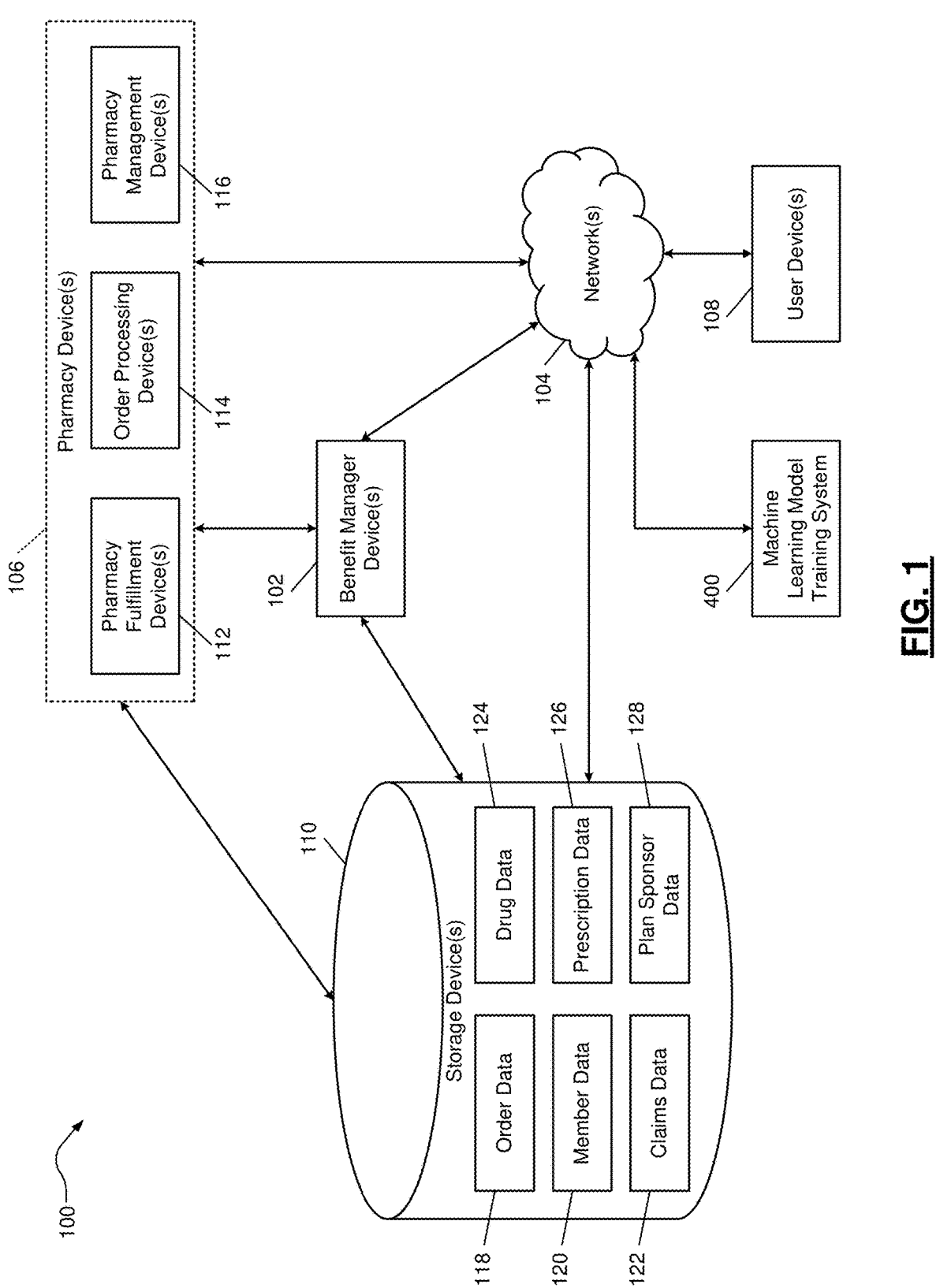
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device.

Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
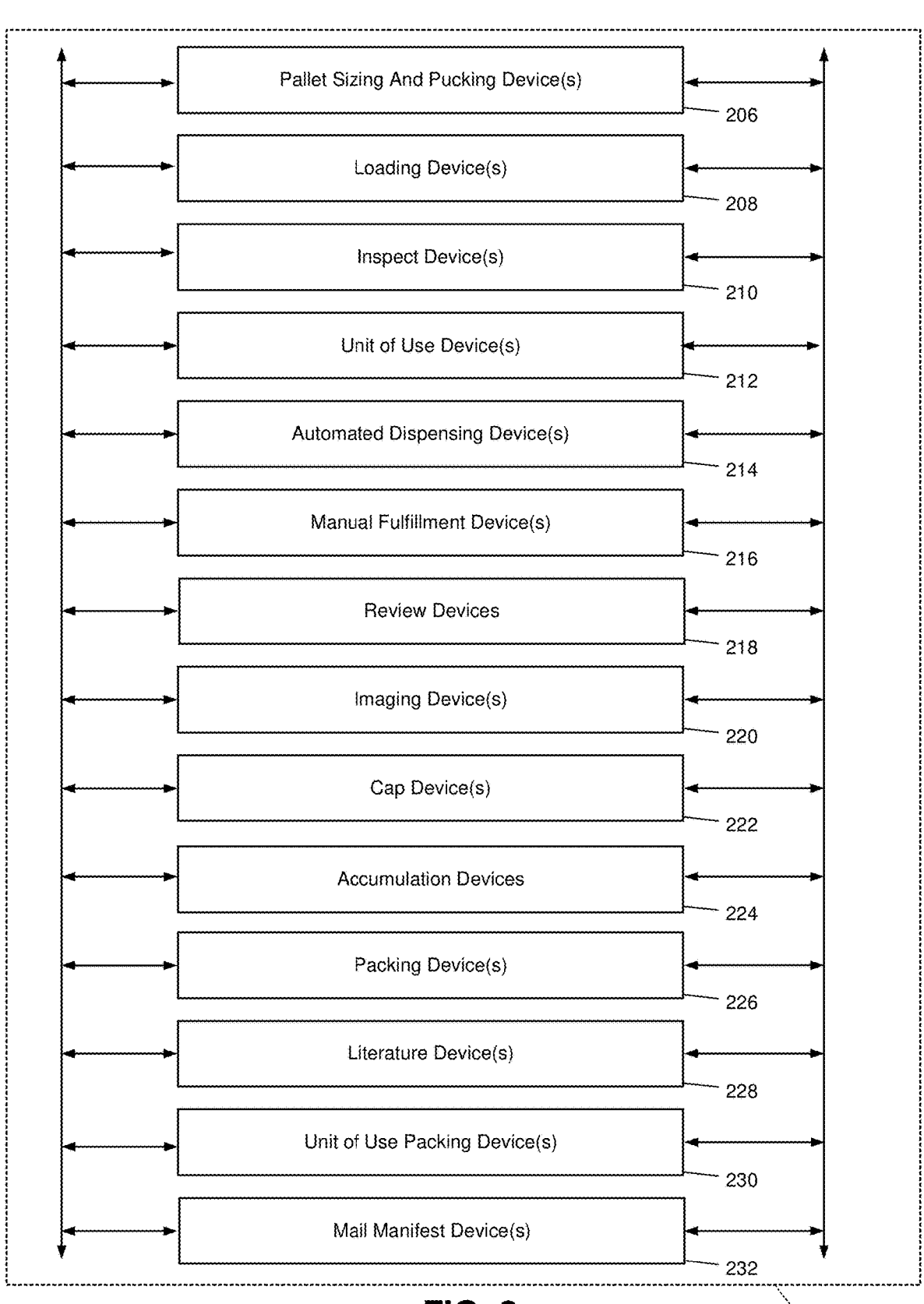
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
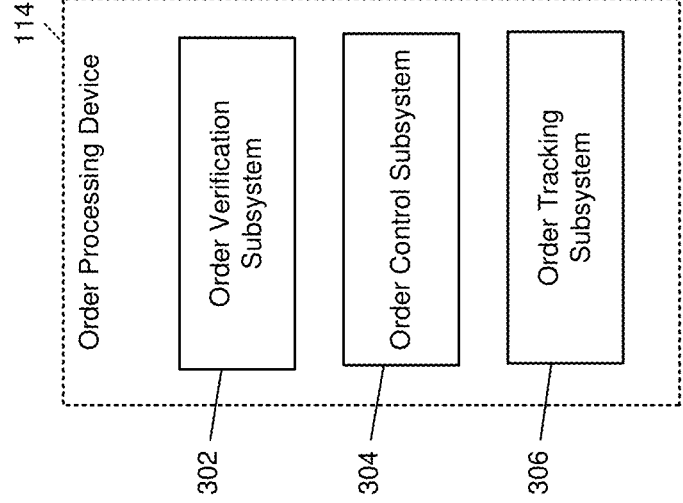
FIG. 3 is a functional block diagram of an example order processing device, which may be deployed within the system of FIG. 1.
Figure 3:

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Machine Learning Model Training System

Figure 4A:
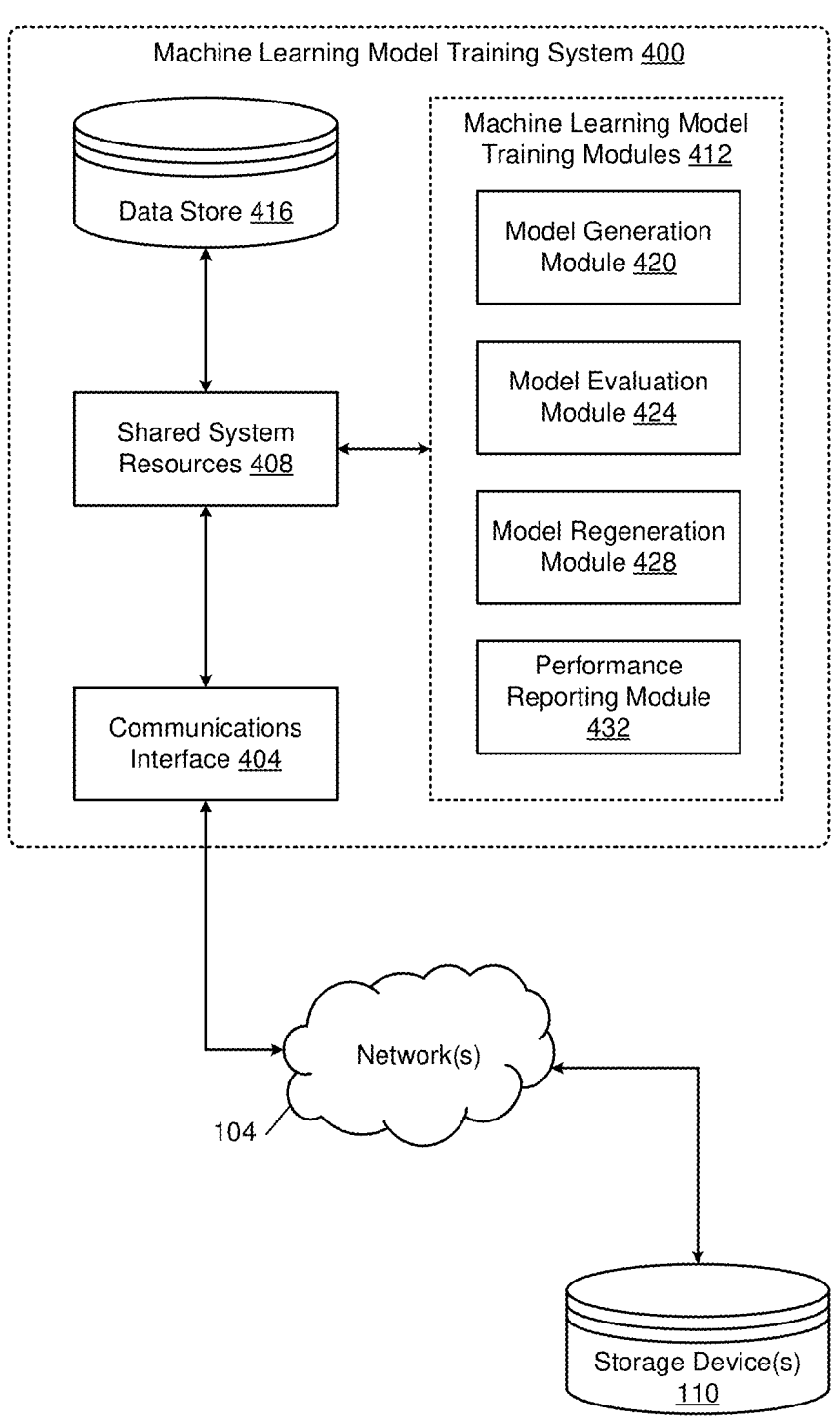
FIG. 4A is a functional block diagram of an example machine learning model training system.

Returning to FIG. 1, the system 100 may include a machine learning model training system—such as machine learning model training system 400—capable of automatically identifying bias in machine learning models and retraining the models to eliminate the identified bias. FIG. 4A is a functional block diagram of an example machine learning model training system 400. As shown in FIG. 4A, the machine learning model training system 400 may include a communications interface 404, shared system resources 408, one or more machine learning model training modules 412, and one or more data stores including non-transitory computer-readable storage media, such as data store 416. In various implementations, the communications interface 404 may be suitable for communicating with other components of the system 100 over the network 104. In various implementations, the communications interface 404 may include a transceiver suitable for sending and/or receiving data to and from other components of the system 100. In various implementations, the shared system resources 408 may include one or more processors, volatile and/or non-volatile computer memory—such as random-access memory, system storage—such as non-transitory computer-readable storage media, and one or more system buses connecting the components.

In various implementations, the communications interface 404, the machine learning model training modules 412, and/or the data store 416 may be operatively coupled to the shared system resources 408 and/or operatively coupled to each other through the shared system resources 408. In various implementations, the machine learning model training modules 412 may be software modules stored on non-transitory computer-readable storage media, such as system storage and/or the one or more data stores of the system 100. In various implementations, one or more processors of the shared system resources 408 may be configured to execute the instructions of the machine learning model training modules 412. In various implementations, the machine learning model training modules 412 may include a model generation module 420, a model evaluation module 424, a model regeneration module 428, and/or a performance reporting module 432.

In various implementations, the model generation module 420 may be configured to generate machine learning models—such as by selecting, training, and evaluating machine learning models. In various implementations, the model evaluation module 424 may be configured to test machine learning models and generate performance metrics of the models—such as metrics related to the bias of the models. In various implementations, the model regeneration module 428 may be configured to regenerate and/or retrain machine learning models based on the metrics generated by the model evaluation module 424. In various implementations, the performance reporting module 432 may be configured to generate one or more reports—such as reports based on the performance metrics generated by the model evaluation module 424 and/or and other metrics generated by the machine learning model training modules 412. More detailed functionality and programming of the machine learning model training modules 412 will be described later on with reference to detailed drawings and/or flowcharts showing programming algorithms.

FIG. 4B is a block diagram showing example data structures that may be stored in data stores—such as data store 416—of the machine learning model training system 400. In various implementations, the data store 416 may include machine learning models 436, machine learning model features 440, machine learning model weights 444, candidate machine learning models 448, machine learning model primary performance metrics 452, machine learning model secondary performance metrics 456, retrained machine learning models 462, and/or accepted machine learning models 466. In various implementations, machine learning models 436 may include data structures related to machine learning models. In various implementations, the machine learning models 436 may include machine learning models that have not been trained—such as machine learning models with default parameters. In various implementations, machine learning model features 440 may include data structures related to various features for machine learning models—such as input variables for the models.

In various implementations, the machine learning model weights 444 may include data structures related to parameters—such as weights—for machine learning models. In various implementations, the candidate machine learning models 448 may include data structures related to trained machine learning models—such as machine learning models with saved parameters. In various implementations, machine learning model primary performance metrics 452 may include data structures related to performance metrics of trained machine learning models evaluated by the machine learning model training system 400—such as accuracy, precision, and/or recall metrics. In various implementations, machine learning model secondary performance metrics 456 may include data structures related to performance metrics of trained machine learning models evaluated by the machine learning model training system 400—such as metrics related to the bias of the models.

In various implementations, retrained machine learning models 462 may include data structures related to machine learning models that have been retrained by the machine learning model training system 400—such as machine learning models that have been adjusted after the system determined that the models had bias errors. In various implementations, accepted machine learning models 466 may include data structures related to machine learning models that have been accepted by the machine learning model training system 400—such as machine learning models that the system determined were bias free. The data structures of data store 416 will be described in further detail later on with reference to detailed drawings and/or flowcharts showing programming algorithms.

Flowcharts

Figure 5:
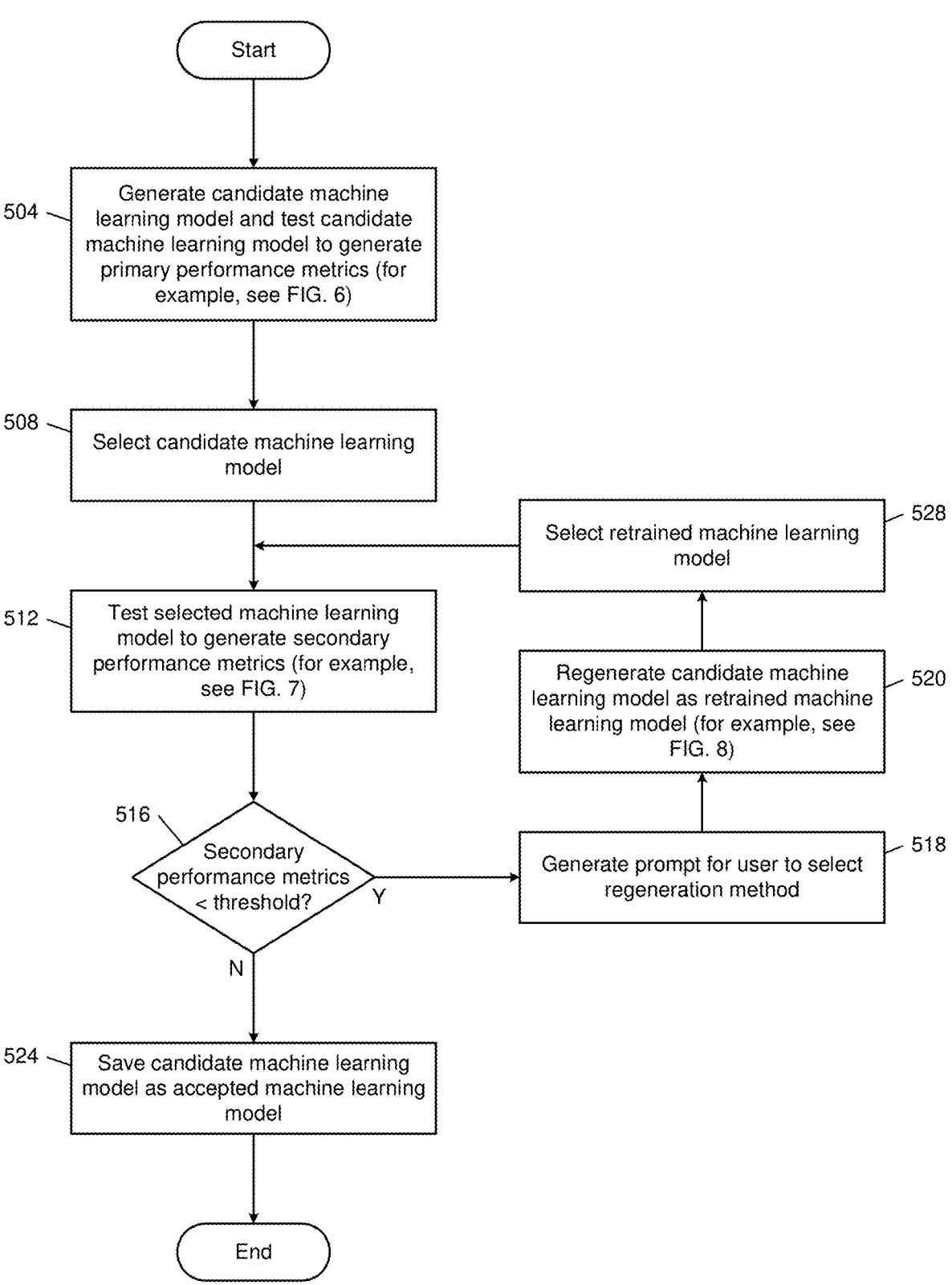
FIG. 5 is a flowchart of an example process for generating machine learning models, evaluating the models for bias, and retraining the models to eliminate bias.

FIG. 5 is a flowchart of an example process for generating machine learning models, evaluating the models for bias, and retraining the models to eliminate bias. Control begins at 504, where the machine learning model training system 400 generates a candidate machine learning model and tests the candidate learning model to generate primary performance metrics for the candidate machine learning model. In various implementations, the candidate machine learning model may be trained and include parameters, such as weights or coefficients. In various implementations, the candidate machine learning model may be saved to candidate machine learning models 448. In various implementations, the primary performance metrics may include an accuracy, precision, and/or recall of the candidate machine learning model. In various implementations, the primary performance metrics may be saved to machine learning model primary performance metrics 452. Additional details of the process of generating and testing the candidate learning model to generate primary performance metrics will be described further on in this specification with reference to FIG. 6. Control proceeds to 508.

At 508, the machine learning model training system 400 selects the candidate machine learning model. In various implementations, the machine learning model training system 400 selects the candidate machine learning model from the candidate machine learning models 448. Control proceeds to 512. At 512, the machine learning model training system 400 tests the selected machine learning model to generate secondary performance characteristics for the selected machine learning model. In various implementations, the secondary performance characteristics may include a numerical score indicative of a bias of the selected machine learning model. In various implementations, the secondary performance characteristics may be saved to machine learning model secondary performance metrics 456. Additional details of the process of testing selected machine learning models to generate secondary performance metrics will be described further on in this specification with reference to FIG. 7. Control proceeds to 516. At 516, the machine learning model training system 400 determines whether the secondary performance metrics are below a threshold. If at 516 the secondary performance metrics are below the threshold, control proceeds to 518. Otherwise, if the secondary control metrics are not below the threshold, control proceeds to 524.

At 518, the machine learning model training system 400 generates a prompt for the user to specify a regeneration method. In various implementations, the user may be prompted to select from a set of methods including, for example, a "reweighing method" and an "alternative models generation method." Control proceeds to 520. At 520, the machine learning model training system 400 regenerates or retrains the candidate machine learning model according to the method selected at 518 and saves the updated model as a retrained machine learning model. In various implementations, the retrained machine learning model may be saved to retrained machine learning models 462. Additional details of regenerating or retraining the candidate machine learning model will be described further on in this specification with reference to FIG. 8. Control proceeds to 528. At 528, the machine learning model training system 400 selects the retrained machine learning model and proceeds back to 512. At 524, the machine learning model training system 400 saves the candidate machine learning model as an accepted machine learning model. In various implementations, the accepted machine learning model may be saved to accepted machine learning models 466.

Figure 6:
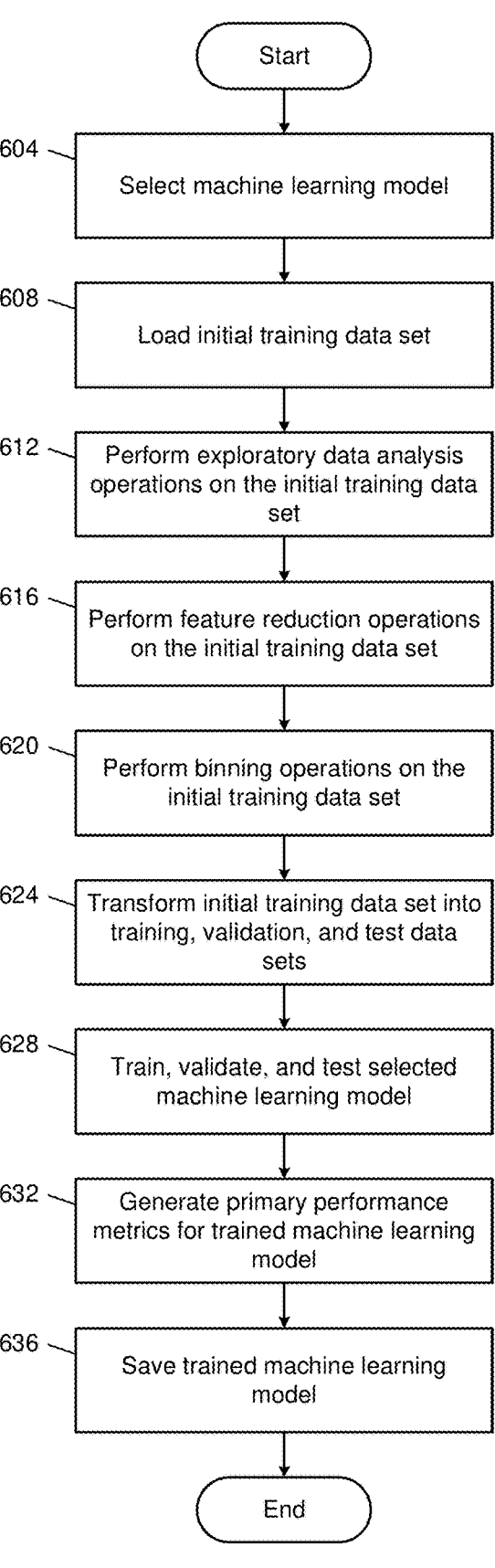
FIG. 6 is a flowchart of an example process for generating and testing candidate machine learning models.

FIG. 6 is a flowchart of an example process for generating and testing candidate machine learning models. Control begins at 604. At 604, the model generation module 420 selects a machine learning model from machine learning models 436. For example, the model generation module 420 may select a logistic regression model. Generally, logistic regression models may be used to solve binary classification problems. In a binary classification problem, the machine learning model is tasked with classifying the elements of a set into one of two groups—for example, a first class and a second class. Generally, a logistic regression model computes a weighted sum of its input variables, passes the weighted sum through a sigmoid function, and calculates a probability of the input variables belonging to the first class. Based on the probability, the logistic regression model can return an output indicating whether the input variables belong to the first class or the second class.

The output of the logistic regression model may be represented by an indicator variable Y, represented in equation (1) below:

$$Y = \begin{cases} 0 \\ 1 \end{cases} \tag{1}$$

As shown in equation (1), the indicator variable Y may be a binary variable returning either 0 or 1. In various implementations, if the indicator variable Y returns 0, then the logistic regression model may be predicting that the input variables belong to the first class. In various implementations, if the indicator variable Y returns 1, then the logistic regression model may be predicting that the input variables belong to the second class.

Logistic regression models may use a logit function to model the probability p of outcomes. For example, probability p may represent the probability of input variables x corresponding to the first class (e.g., the indicator variable Y being 1). Correspondingly, $1-p$ may represent the probability of input variables x corresponding to the second class (e.g., the indicator variable Y being 0). These relationships between the p and Y may be shown below in equations (2) and (3):

$$p(x) = p(Y = 1 | X = x) \tag{2}$$

$$1 - p(x) = p(Y = 0 | X = x) \tag{3}$$

If the conditional probability $p(x)$ is to be modeled as a function of x—and in order to have a binary output variable Y—any unknown parameters in the conditional probability function may be estimated by a maximum likelihood. The relationship between the conditional probability p and the input variables x may be expressed using a logit model, shown below in equation (4):

$$\log\left(\frac{p(x)}{1 - p(x)}\right) = \beta_0 + \beta_1 x_1 + \beta_2 x_2 + \ldots + \beta_n x_n \tag{4}$$

The logit model of equation (4) may be expanded as necessary to accommodate any number n of input variables x. Each input variable x may have an associated coefficient $\beta$, and the model may also include a coefficient $\beta_0$ that is not associated with any input variable. Solving for the probability p, the logit model of equation (4) may be expressed as equation (5) below:

$$p(x) = \frac{e^{\beta_0 + \beta_1 x_1 + \beta_2 x_2 + \ldots + \beta_n x_n}}{1 + e^{\beta_0 + \beta_1 x_1 + \beta_2 x_2 + \ldots + \beta_n x_n}} \tag{5}$$

As shown in equation (5), $p(x)$ may be expressed as a sigmoid function. The logistic regression model assumes that the response—the output variable Y—is conditionally Bernoulli distributed, given the values of the input variables x. This relationship is illustrated in equation (6) below:

$$Y|x \sim \text{Bernoulli}\left(p(x) = \frac{e^{\beta_0 + \beta_1 x_1 + \beta_2 x_2 + ... + \beta_n x_n}}{1 + e^{\beta_0 + \beta_1 x_1 + \beta_2 x_2 + ... + \beta_n x_n}}\right) \qquad (5)$$

After the machine learning model—such as the logistic regression model—is selected at 604, control proceeds to 608. While the logistic regression model is described as being selected at 604, any other suitable machine learning models—such as neural networks—may be selected at 604. At 608, the model generation module 420 loads an initial training data set. In various implementations, if the logistic regression model is selected, then the training data set should include input variables x, an associated output variable Y indicating whether the set of input variables x belongs to the first class (e.g., 0) or to the second class (e.g., 1), and an predicted probability p of Y being 0. For example, the initial training data set may be in a format shown in expression (6) below:

| $x_1$ | $x_2$ | $x_3$ | $Y_i$ | $p(x_i)$ | |
|---|---|---|---|---|---|
| 1 | 3 | $c_1$ | 0 | $p_1$ | (6) |
| 2 | 4 | $c_1$ | 0 | $p_2$ | |
| 1 | 2 | $c_1$ | 0 | $p_3$ | |
| 3 | 1 | $c_1$ | 0 | $p_4$ | |
| 4 | 9 | $c_2$ | 1 | $p_5$ | |
| 6 | 8 | $c_2$ | 1 | $p_6$ | |
| 5 | 8 | $c_2$ | 1 | $p_7$ | |
| 9 | 9 | $c_2$ | 1 | $p_8$ | |

In expression (6) above, because $p_1$ through $p_4$ are associated with input variables x belonging to the first class (Y=0), $p_1$ through $p_4$ should have relatively smaller values. Because $p_5$ through $p_8$ are associated with input variables x belonging to the first class (Y=1), $p_5$ through $p_8$ should have relatively larger values. After the initial training data set—such as that represented by expression (6)—is loaded, control proceeds to 612.

At 612, the model generation module 420 may perform exploratory data analysis operations on the initial training data set. For example, at 612, the model generation module 420 may perform data cleaning operations on the initial training data set by removing missing values, outliers, unnecessary rows and/or columns, and/or re-indexing or reformatting the data as appropriate. Control proceeds to 616. At 616, the model generation module 420 may perform feature reduction operations on the initial training data set as appropriate. Control proceeds to 620. At 620, the model generation module 420 may perform binning operations on the initial training data set as appropriate. Control proceeds to 624. At 624, the model generation module 420 may transform—such as by dividing—the initial training data set into training, validation, and test data sets. In various implementations, the training data set may be used to train the machine learning model. In various implementations, the validation data set may be used to validate the machine learning model. In various implementations, the test data set may be used to test the machine learning model. Control proceeds to 628.

At 628, the model generation module 420 uses the training data set to train the selected machine learning model. For example, if the selected machine learning model is a logistic regression model, the training data set may be used to fit the logistic regression model by determining coefficients $\beta_1 \ldots \beta_n$ for each input variable x and coefficient $\beta_0$—which is not associated with an input variable. In examples where the selected machine learning model is a logistic regression model, coefficients $\beta$ should be selected to maximize the logistic regression model's probability of correctly classifying the input variables x. For example, coefficients $\beta$ should be selected to maximize the number of times the logistic regression model's output Y matches that of the training data for the input variables x in the training data. In examples where the selected machine learning model is a logistic regression model, p(x) is a function of $\beta_0 \ldots \beta_i$, and so the likelihood function L can be expressed according to equations (7) and (8) below:

$$L(\beta_0, \beta_i) = \prod_{i=1}^{n} p(Y_i = y_i | X_i = x_i) \qquad (7)$$

$$L(\beta_0, \beta_i) = \prod_{i=1}^{n} p(x_i)^{y_i} \cdot p(1 - x_i)^{1-y_i} \qquad (8)$$

Since logarithms are monotonically increasing functions, taking a logarithm on both sides of the likelihood function of equation (8) will maximize the likelihood, equation (9):

$$L(\beta_0, \beta_i) = \sum_{i=1}^{n} y_i \log(p(x_i)) + \sum_{i=1}^{n} (1 - y_i) \cdot \log(1 - p(x_i)) \qquad (9)$$

In order to determine maxima of equation (9), derivatives may be taken with respect to $\beta_0$ and $\beta_i$—equations (10) and (11) below, respectively:

$$\frac{\partial}{\partial \beta_0} \log L(\beta_0, \beta_i) = \sum_{i=1}^{n} y_i - \sum_{i=1}^{n} \frac{e^{\beta_0 + \beta_i x_i}}{1 + e^{\beta_0 + \beta_i x_i}} \qquad (10)$$

$$\frac{\partial}{\partial \beta_i} \log L(\beta_0, \beta_i) = \sum_{i=1}^{n} x_i y_i - \sum_{i=1}^{n} x_i \cdot \frac{e^{\beta_0 + \beta_i x_i}}{1 + e^{\beta_0 + \beta_i x_i}} \qquad (11)$$

Equations (10) and (11)—and analogous equations for any other coefficients $\beta$—may be set to zero and numerically solved to estimate $\beta_0 \ldots \beta_i$. In various implementations, equations (9)-(11) may be optimized—and coefficients $\beta$ may be estimated—using numerical methods such as gradient descent, Newton's method, and/or iteratively reweighted least squares (IRLS).

In various implementations, the model generation module 420 may use the IRLS algorithm to determine coefficients $\beta$. For example, at step 1, the model generation module 420 chooses starting values for $\beta_0 \ldots \beta_i$ and computes $p_i$ according to the logistic regression model—for example, according to equations (4) or (5) above. Then, at step 2, the model generation module 420 defines a new regression problem indicated by $z_i$, equation (12) below:

$$z_i = \text{logit}(p_i) + (Y_i - p_i)\left(\frac{1}{p_i(1 - p_i)}\right)$$ (12)

At step 3, the model generation module 420 defines a new diagonal matrix W and sets each diagonal element (i,i) equal to $p_i(1-p_i)$. At step 4, the model generation module 420 defines estimates the parameters β using a weighted least squares solution, equation (13):

$$\hat{\beta} = \left(X^T W X\right)^{-1} X^T W Y$$ (13)

For example, equation (13) may represent a weighted least squares of Z on Y. At step 5, the model generation module 420 recalculates the log-likelihood—for example, using equations (7)-(9) above—using the new estimated parameters β and iterates through steps 2-5 until the log-likelihoods converge. In various implementations, after the selected machine learning model is trained—for example, after estimated parameters β have been calculated and saved to the model, the model generation module 420 validates the trained machine learning model using the validation data sets. In various implementations, the model generation module 420 may also test the trained machine learning model using the test data sets. Control proceeds to 632.

At 632, the model generation module 420 generates primary performance metrics—such as accuracy, performance, and/or recall—for the trained machine learning model. In various implementations, the model generation module 420 saves the primary performance metrics to machine learning model primary performance metrics 452. Control proceeds to 636. At 636, the model generation module 420 saves the trained machine learning model to one or more data stores. For example, the model generation module 420 may save the trained machine learning model to candidate machine learning model 448 as a candidate machine learning model.

Figure 7:
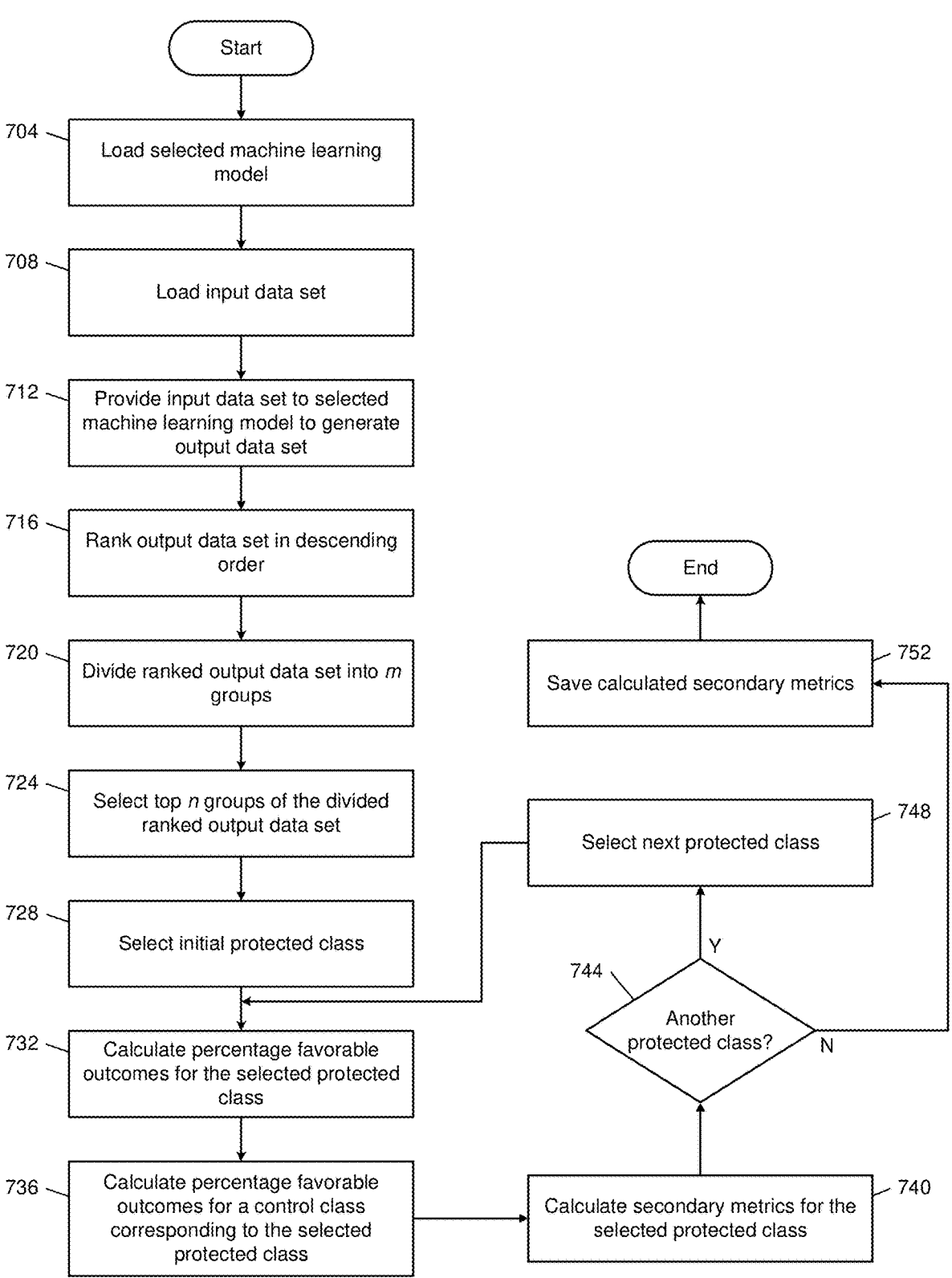
FIG. 7 is a flowchart of an example process for testing machine learning models to generate secondary performance metrics.

FIG. 7 is a flowchart of an example process for testing machine learning models to generate secondary performance metrics. Control begins at 704. At 704, the model evaluation module 424 loads a selected machine learning model. In various implementations, the selected machine learning model may be a candidate machine learning model from candidate machine learning models 448. Control proceeds to 708. At 708, the model evaluation module 424 loads an input data set for the selected machine learning model. In various implementations, the input data set may be loaded from storage device 110. In various implementations, the input data may include features related to members, including demographic features and features related to the medical history of the member. In various implementations, demographic features may include information related to the age, gender, and race of the member, as well as geographic and socioeconomic information related to the member.

Control proceeds to 712. At 712, the model evaluation module 424 provides the input data set to the selected machine learning model to generate an output data set. In various implementations, the output data set may include results of providing elements of the input data set to the selected machine learning model. For example, the output data set may include predicted likelihoods of outcomes for members based on the input variables for the member present in the input data set. In various implementations, if the selected machine learning model is a logistic regression model, the output data set may include a probability p and/or an indicator variable Y for each member. In various implementations, the results output data set may be correlated to demographic information of the member—such as age, gender, and race. Control proceeds to 716.

At 716, the model evaluation module 424 ranks the output data set in descending order. In various implementations, the model evaluation module 424 may rank the output data set according to the predicted likelihood of outcomes—such as probability p. For example, the model evaluation module 424 may rank the output data set in descending order of probability score p—from largest to smallest. Control proceeds to 720. At 720, the model evaluation module 424 divides the ranked output data set into m groups. In various implementations, the ranked output data set may be divided evenly into m groups such that each group is equal or about equal in size. In various implementations, m may be about 10. Control proceeds to 724. At 724, the model evaluation module 424 may select the top n groups of the divided ranked output data set. For example, the model evaluation module 424 may select the n groups having the highest probability scores p. In various implementations, n may be about three. Control proceeds to 728.

At 728, the model evaluation module 424 selects an initial protected class. In various implementations, protected classes and their corresponding control classes may be indicated by table 1 below:

TABLE 1

| Protected Class | Control Class |
|---|---|
| age ≥ 65<br>gender = female | age < 65<br>gender = male |
| race $\in \left\{ \begin{array}{l} \text{black} \\ \text{Hispanic} \\ \text{Asian} \\ \text{American Indian} \\ \text{multiple races} \end{array} \right\}$ | race = white |

Control proceeds to 732. At 732, the model evaluation module 424 calculates a percentage favorable outcomes metric $q'_{protected}$ for the selected protected class according to a number of predicted favorable outcomes for the predicted class $n'_{protected}$ and a total number of members of the protected class $n_{protected}$. In various implementations, $n'_{protected}$ may be a number of members within the selected n groups that belong to the selected protected class and have (i) probability scores p above a threshold and/or (ii) indicator variables Y=1. In various implementations, $n_{protected}$ may be a number of members within the selected n groups that belong to the selected protected class. In various implementations, $q'_{protected}$ may be calculated according to equation (14) below:

$$q'_{protected} = \frac{n'_{protected}}{n_{protected}}$$ (14)

Control proceeds to 736. At 736, the model evaluation module 424 calculates a percentage favorable outcomes metric $q'_{control}$ for a control class corresponding to the selected protected class according to a number of predicted favorable outcomes for the control class $n'_{control}$ and a total number of members of the control class $n_{control}$. In various implementations, $n'_{control}$ may be a number of members within the selected n groups that belong to the control class corresponding to the selected protected class and have (i) probability scores p above a threshold and/or (ii) indicator variables Y=1. In various implementations, $n_{control}$ may be a number of members within the selected n groups that belong to the control class corresponding to the selected protected class. In various implementations, $q'_{control}$ may be calculated according to equation (15) below:

$$q'_{control} = \frac{n'_{control}}{n_{control}} \qquad (15)$$

Control proceeds to 740. At 740, the model evaluation module 424 calculates secondary metrics for the selected protected class. In various implementations, the secondary metrics may include an Adverse Impact Ratio (AIR). In various implementations, the AIR may be calculated according to equation (16) below:

$$AIR = \frac{q'_{protected}}{q'_{control}} \qquad (15)$$

Control proceeds to 744. At 744, the model evaluation module 424 determines whether another protected class exists for which an AIR has not yet been calculated. If yes, control proceeds to 748. Otherwise, control proceeds to 752. At 748, the model evaluation module 424 selects the next protected class and proceeds back to 732. At 752, the model evaluation module 424 saves the calculated secondary metrics. In various implementations, the model evaluation module 424 saves the calculated secondary metrics to machine learning model secondary performance metrics 456.

Figure 8:
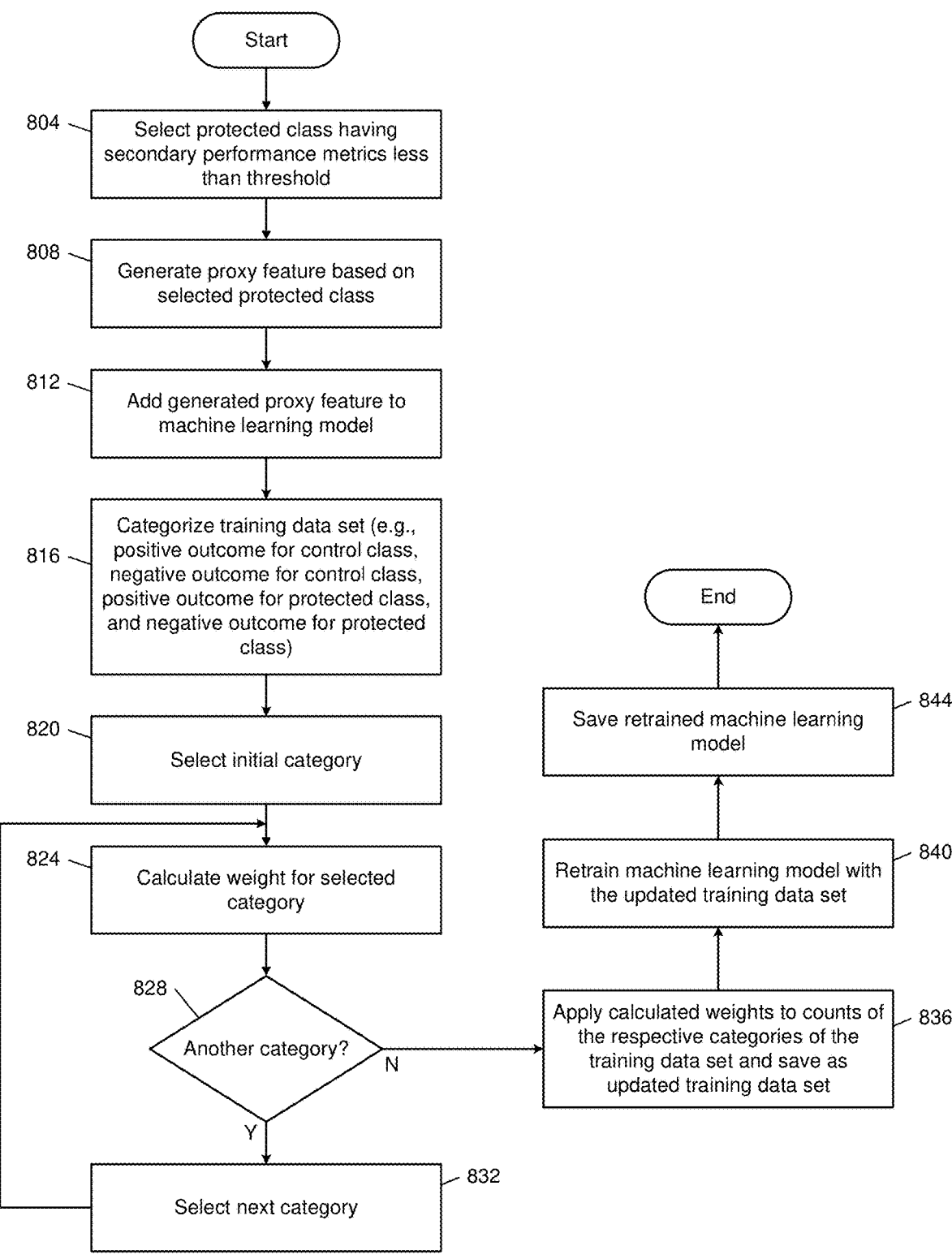
FIG. 8 is a flowchart of an example process for regenerating candidate machine learning models.

FIG. 8 is a flowchart of an example process for regenerating candidate machine learning models. Control begins at 804. At 804, the model regeneration module 428 selects a protected class having secondary performance metrics less than the threshold—for example, the threshold used at 516. For example, if the AIR of a candidate machine learning model is calculated to be less than the threshold for the protected class of members with ages greater than or equal to 65, then the model regeneration module 428 selects the protected class of members with ages greater than or equal to 65. In various implementations, the threshold—which may also be used at 516—may be about 0.9. Control proceeds to 808.

At 808, the model regeneration module 428 generates a proxy feature based on the selected protected class. For example, if the selected protected class is members with ages greater than or equal to 65, then the model regeneration module 428 generates a corresponding proxy feature. In various implementations, if the candidate machine learning model is a logistic regression model, then the proxy feature may be an input variable x corresponding to the proxy feature. Control proceeds to 812, where control adds the generated proxy feature to the machine learning model. Control proceeds to 816.

At 816, the model regeneration module 428 loads the training data set—such as the training data set loaded at 608 and/or used at 628—and categorizes the training data set into one or more categories. In various implementations, the training data set may be categorized into the categories indicated below in table 2:

TABLE 2

| Categories | |
| --- | --- |
| Outcome | Group |
| positive (Y = 1) | protected class |
| negative (Y = 0) | protected class |
| positive (Y = 1) | control class |
| negative (Y = 0) | control class |

Each category of table 2 is indicated by a row and includes both an outcome and a group. So, for example, the first category of table 2 may be "positive outcomes for the protected class." Control proceeds to 820. At 820, the model regeneration module 428 selects the initial category—such as from table 2 above. Control proceeds to 824. At 824, the model regeneration module 428 calculates a weight $W_*$ for the selected category. In various implementations, $W_*$ may be calculated according to equation (16) below, where $N_1$ is a number of observances of the group of the selected category in the training data, $N_2$ is a number of observances of the outcomes of the selected category in the training data, $N_{total}$ is a number of total observances in the training data, and $N_3$ is a number of total observances of the selected category:

$$W_* = \frac{N_1 \cdot N_2}{N_{total} \cdot N_3} \qquad (16)$$

So if the first row of table 2 is selected at 820, then $N_1$ is the number of observances in the training data where the member belongs to the protected class, $N_2$ is the number of observances in the training data where the member had a positive outcome (Y=1), $N_{total}$ is the total number of observances in the training data, and $N_3$ is the number of observances in the training data where the member belongs to the protected class and had a positive outcome (Y=1). Control proceeds to 828.

At 828, the model regeneration module 428 determines whether there is another category for which a weight $W_*$ has not been calculated. If yes, control proceeds to 832. Otherwise, control proceeds to 836. At 832, the model regeneration module 428 selects the next category—such as from table 2—and proceeds back to 824. At 836, the model regeneration module 428 applies the calculated weights $W_*$ to their respective categories in the training data set. For example, for the weight $W_*$ calculated for members of the protected class having positive outcomes (Y=1), the model regeneration module 428 applies the weight $W_*$—such as multiplying the training data by the weight—to portions of the training data set where the member belongs to the protected class and had a positive outcome (Y=1). After the weights We have been applied to each respective category of the training data set, the model regeneration module 428 saves the updated training data set. Control proceeds to 840.

At 840, the model regeneration module 428 retrains the selected machine learning model using the updated training data set. In various implementations—for example, if the selected machine learning model is a logistic regression model, the model regeneration module 428 may retrain the selected machine learning model using the updated training data set according to the principles previously described with respect to 628. Control proceeds to 844. At 844, the model regeneration module 428 saves the retrained machine learning model. In various implementations, the model regeneration module 428 may save the retrained machine learning model to retrained machine learning models 462.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A computer-implemented method of increasing accuracy of a machine learning model, the method comprising:
   generating a candidate machine learning model, wherein the candidate machine learning model is configured to generate probability scores for members;
   training the candidate machine learning model using an initial data set, wherein the initial data set includes bias;
   testing the candidate machine learning model to generate performance metrics, wherein the performance metrics indicate a bias value correlated to the candidate machine learning model;
   determining whether the performance metrics are below a threshold; and in response to determining that the performance metrics are below the threshold:
      generating a proxy feature based on the bias value,
      adding the proxy feature to the candidate machine learning model,
      calculating weights based on the bias value,
      updating the initial data set using the weights to generate an updated data set, wherein the updated data set mitigates bias, and
      retraining the candidate machine learning model using the updated data set.

2. The method of claim 1 further comprising, in response to determining that the performance metrics are not below the threshold, saving the candidate machine learning model as an accepted machine learning model.

3. The method of claim 1 further comprising:
   testing the retrained candidate machine learning model to generate updated performance metrics; and
   in response to determining that the updated performance metrics are not below the threshold, saving the retrained candidate machine learning model as an accepted machine learning model.

4. The method of claim 1 wherein the performance metrics are generated by:
   calculating a percentage favorable outcomes metric for a protected class;
   calculating a percentage favorable outcomes metric for a control class; and
   calculating an impact ratio based on the percentage favorable outcomes metric for the protected class and the percentage favorable outcomes metric for the control class.

5. The method of claim 4 wherein the percentage favorable outcomes metric for the protected class is calculated by:
   determining a first value indicative of a number of members belonging to the protected class having generated probability scores above a second threshold;
   determining a second value indicative of a number of members belonging to the protected class; and
   calculating the percentage favorable outcomes metric for the protected class by dividing the first value by the second value.

6. The method of claim 5 wherein the percentage favorable outcomes metric for the protected class is calculated by:
   determining a third value indicative of a number of members belonging to the protected class having generated probability scores above a second threshold;
   determining a fourth value indicative of a number of members belonging to the protected class; and
   calculating the percentage favorable outcomes metric for the protected class by dividing the first value by the second value.

7. The method of claim 6 wherein the impact ratio is calculated by dividing the percentage favorable outcomes metric for the protected class by the percentage favorable outcomes metric for the control class.

8. The method of claim 7 wherein generating the proxy feature based on the bias values comprises:
   determining a protected class associated with the bias value; and
   generating the proxy feature to represent the protected class associated with the bias value.

9. The method of claim 8 wherein:
   the candidate machine learning model is a logistic regression model; and adding the proxy feature to the machine learning model includes adding an input variable representing the proxy feature to the logistic regression model.

10. The method of claim 9 wherein calculating weights based on the bias value includes:

dividing the initial data set into categories; and for each category:

calculating a fifth value related to a number of observances of the protected class or the control class in the category, calculating a sixth value related to a number of observances of a positive or a negative outcome in the category, calculating a seventh value related to a total number of observances in the initial data, calculating an eighth value related to a total number of observances in the category, and dividing a product of the fifth value and the sixth value with a product of the seventh value and the eighth value.

11. A system of increasing accuracy of a machine learning model, the system comprising:

memory hardware configured to store instructions; and processing hardware configured to execute the instructions, wherein the instructions include:

generating a candidate machine learning model, wherein the candidate machine learning model is configured to generate probability scores for members;

training the candidate machine learning model using an initial data set, wherein the initial data set includes bias;

testing the candidate machine learning model to generate performance metrics, wherein the performance metrics indicate a bias value correlated to the candidate machine learning model;

determining whether the performance metrics are below a threshold; and in response to determining that the performance metrics are below the threshold:

generating a proxy feature based on the bias value, adding the proxy feature to the candidate machine learning model, calculating weights based on the bias value, updating the initial data set using the weights to generate an updated data set, wherein the updated data set mitigates bias, and retraining the candidate machine learning model using the updated data set.

12. The system of claim 11 wherein the instructions include, in response to determining that the performance metrics are not below the threshold, saving the candidate machine learning model as an accepted machine learning model.

13. The system of claim 11 wherein the instructions include:

testing the retrained candidate machine learning model to generate updated performance metrics; and in response to determining that the updated performance metrics are not below the threshold, saving the retrained candidate machine learning model as an accepted machine learning model.

14. The system of claim 11 wherein the performance metrics are generated by:

calculating a percentage favorable outcomes metric for a protected class;

calculating a percentage favorable outcomes metric for a control class; and calculating an impact ratio based on the percentage favorable outcomes metric for the protected class and the percentage favorable outcomes metric for the control class.

15. The system of claim 14 wherein the percentage favorable outcomes metric for the protected class is calculated by:

determining a first value indicative of a number of members belonging to the protected class having generated probability scores above a second threshold;

determining a second value indicative of a number of members belonging to the protected class; and calculating the percentage favorable outcomes metric for the protected class by dividing the first value by the second value.

16. The system of claim 15 wherein the percentage favorable outcomes metric for the protected class is calculated by:

determining a third value indicative of a number of members belonging to the protected class having generated probability scores above a second threshold;

determining a fourth value indicative of a number of members belonging to the protected class; and calculating the percentage favorable outcomes metric for the protected class by dividing the first value by the second value.

17. The system of claim 16 wherein the impact ratio is calculated by dividing the percentage favorable outcomes metric for the protected class by the percentage favorable outcomes metric for the control class.

18. The system of claim 17 wherein generating the proxy feature based on the bias values comprises:

determining a protected class associated with the bias value; and generating the proxy feature to represent the protected class associated with the bias value.

19. The system of claim 18 wherein:

the candidate machine learning model is a logistic regression model; and adding the proxy feature to the machine learning model includes adding an input variable representing the proxy feature to the logistic regression model.

20. The system of claim 19 wherein calculating weights based on the bias value includes:

dividing the initial data set into categories; and for each category:

calculating a fifth value related to a number of observances of the protected class or the control class in the category, calculating a sixth value related to a number of observances of a positive or a negative outcome in the category, calculating a seventh value related to a total number of observances in the initial data, calculating an eighth value related to a total number of observances in the category, and dividing a product of the fifth value and the sixth value with a product of the seventh value and the eighth value.

\* \* \* \* \*